Jan. 5, 1932.  J. W. BRYCE  1,839,373
WEIGHING SCALE
Filed June 19, 1928
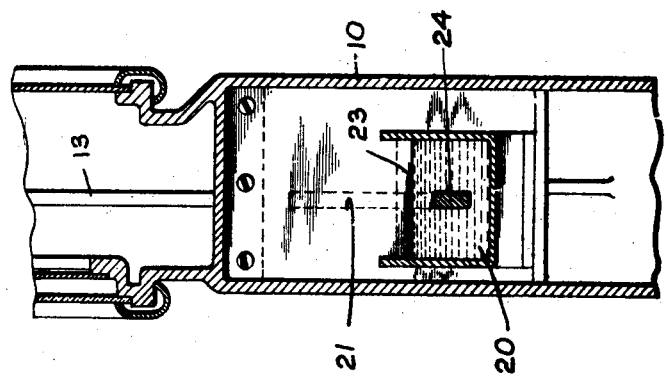
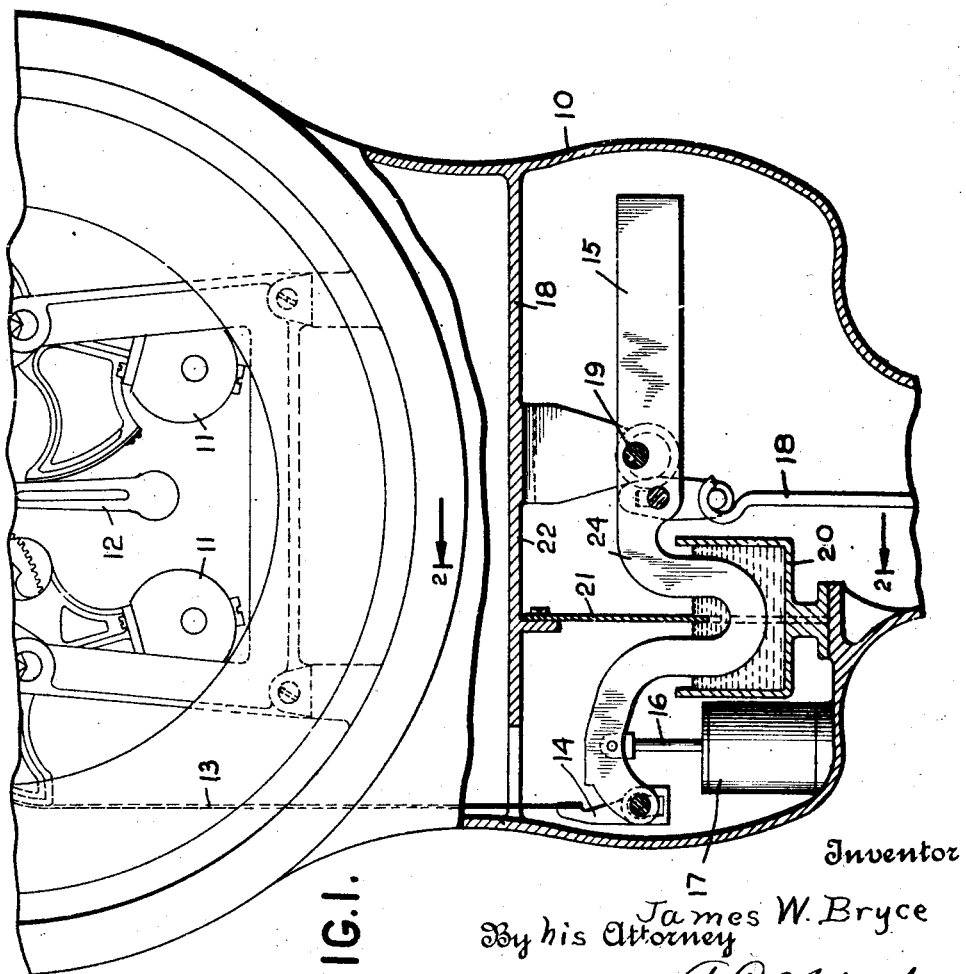
Inventor
James W. Bryce
By his Attorney
A.C. Maby Patented Jan. 5, 1932

1,839,373

UNITED STATES PATENT OFFICE

JAMES W. BRYCE, OF BLOOMFIELD, NEW JERSEY, ASSIGNOR TO DAYTON SCALE COMPANY, OF DAYTON, OHIO, A CORPORATION OF NEW JERSEY

WEIGHING SCALE

Application filed June 19, 1928. Serial No. 286,652.

This invention relates to weighing scales.

The object of the invention is to provide means for sealing certain portions of the scale from others.

The object of the invention is further to apply a seal to a rockable scale member.

Others objects and advantages of my invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 1 is a front view of part of a scale to which this invention is applied, showing certain portions in section.

Fig. 2 is a section on line 2—2 of Fig. 1.

While the invention has been shown as applied to a scale of the pendulum automatic counterbalance type wherein the weight is indicated on a dial, it will be understood that the invention is applicable to a scale of the drum or fan type or to a scale having a spring or poise counterbalance.

Referring to the drawings in detail, 10 is the scale housing in the upper part of which is enclosed the automatic counterbalancing mechanism comprising pendulums 11, the movement of which in proportion to the load rotates an indicator 12 which cooperates with a graduated chart in a manner well known in the art. The pendulums are actuated through a tape 13 connected to a member 14 fulcrumed to one end of a lever 15. The same end of the lever is provided with a plunger 16 for movement in a dash pot 17 to damp the oscillations of the lever when a load is applied or removed. The lever is connected to platform levers or other load bearing means by a draft rod 18. Upon the application of a load, rod 18 will move downwardly rocking lever 15 counterclockwise on its pivot 19 and through tape 13 swinging the pendulums 11.

The accuracy of the scale is materially reduced when moisture, fumes, or other foreign elements enter the scale housing causing rusting and corrosion of the metal parts. The accuracy of the weighing operation depends largely on the fine adjustment of the automatic counterbalancing parts contained in the upper portion of the housing 10. Thus any change in weight of the pendulum bobs or in length of the lever arms changes the weighing factors and results in wrong readings. Such changes may be due to corrosion of the fulcrums, fulcrum supporting means, pendulums, pendulum cams, the pendulum supports, or other associated elements. In order to exclude foreign elements from these automatic counterbalancing parts of the scale, a fluid seal is provided which comprises a cup 20 fixed to the frame and a plate 21 attached to the frame plate 22 from which the lever 15 is suspended. Cup 20 and plate 21 completely cover the width of the housing 10, as seen in Fig. 2. Plate 21 has a portion 23 extending below the surface of the fluid in the cup 20. Air tight joints are formed between the frame, the plate 21, and the cup 20. An effective seal is thus provided by cup 20 and plate 21 preventing the passage of foreign elements to the upper portion of the scale. Lever 15 is provided with a U-shaped portion 24 which is immersed in the fluid in cup 20 and passes under plate portion 23. The rocking of lever 15 may thus take place unimpeded by the seal structure and yet not interfere with the efficacy of the seal.

It is obvious that the plate 21 and cup 20 may be constructed integrally with the housing or that plate 21 may be made integral with the cup 20.

Any suitable fluid such as oil may be used in cup 21.

While I have shown and described and pointed out the fundamental novel features of the invention as applied to a single modification it will be understood that various omissions and substitutions and changes in the form and details of the device illustrated and in its operation may be made by those skilled in the art without departing from the spirit of the invention. I intend to be limited therefore only as indicated by the scope of the following claims:

1. A scale comprising load counterbalancing means, an element for transmitting the load to said means, said element and counterbalancing means being separately supported, a vertical wall between one part of said element and the counterbalancing means and beneath which the element passes, and sealing means cooperating with said wall to seal said one part of said element from the rest of the element.

2. A scale comprising a load-responsive member, a dash-pot for reducing oscillation of said member, a connection between said member and said dash-pot, a housing substantially enclosing the dash-pot and provided with an opening through which the connection passes, and fluid sealing means for said opening.

3. A scale comprising load counterbalancing means, an element below said means for actuating said counterbalancing means, and a seal having all its parts supported independently of said element for sealing the element from the counterbalancing means.

4. In a scale, counterbalancing means, a lever supported separately from and at a distance from said counterbalancing means for actuating said means, a housing enclosing said counterbalancing means, said housing being substantially closed except for an opening through which said lever passes, and a seal applied to said opening.

5. In a scale, counterbalancing means, a horizontally disposed member for actuating said counterbalancing means, a housing for enclosing said counterbalancing means and including a partition for isolating said member from said means, said housing being provided with an opening between said member and said means through which said member passes, and means for sealing said opening.

6. In a scale, counterbalancing means, a horizontally disposed lever for actuating said counterbalancing means, a housing enclosing said counterbalancing means and provided with an opening through which said lever passes, a sealing device for said opening, said lever having a U-shaped bend passing through said sealing device.

7. A scale comprising counterbalancing means, a rockable member for actuating said means, and liquid means for sealing one portion of said rockable member from the other.

8. A scale comprising counterbalancing means, an element for actuating said means, a housing enclosing said counterbalancing means and provided with an opening, a cup filled with a fluid supported on the bottom of said opening and a vertically disposed plate having its end immersed in said fluid, said element passing beneath said plate end.

9. A scale comprising load counterbalancing means, an element for actuating said counterbalancing means, and a liquid seal having a stationary fixed cup filled with liquid and a stationary plate immersed in said liquid, said element passing through said liquid and below said plate for sealing the element from the counterbalancing means.

10. A scale comprising load counterbalancing means, a lever for actuating said means, a housing having an opening through which said lever passes, said counterbalancing means being completely enclosed by said housing, and a fluid seal for said opening.

11. A scale comprising automatic load counterbalancing means, a lever for actuating said means, a wall disposed between and completely separating said lever from said counterbalancing means, and a fluid seal applied to said lever for sealing said lever from the counterbalancing means.

12. A scale comprising enclosed load counterbalancing means, a horizontally disposed element for actuating the same, and means engaging a portion only of said element for sealing said element from said means to prevent air escaping past said element to said means.

In testimony whereof I hereto affix my signature.

JAMES W. BRYCE.